(12) United States Patent
Duan

(10) Patent No.: US 10,478,933 B2
(45) Date of Patent: Nov. 19, 2019

(54) ANGLE GRINDER, POWER TOOL AND BRAKING METHOD THEREOF

(71) Applicant: Nanjing Chervon Industry Co., Ltd., Nanjing (CN)

(72) Inventor: Junya Duan, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 175 days.

(21) Appl. No.: 15/820,646

(22) Filed: Nov. 22, 2017

(65) Prior Publication Data

US 2018/0147682 A1 May 31, 2018

(30) Foreign Application Priority Data

Nov. 25, 2016 (CN) .......................... 2016 1 1061012

(51) Int. Cl.
*B24B 27/08* (2006.01)
*B23Q 11/00* (2006.01)
*B24B 47/12* (2006.01)
*H02P 3/02* (2006.01)
*H02P 3/16* (2006.01)

(52) U.S. Cl.
CPC .......... *B23Q 11/0092* (2013.01); *B24B 27/08* (2013.01); *B24B 47/12* (2013.01); *H02P 3/02* (2013.01); *H02P 3/16* (2013.01)

(58) Field of Classification Search
CPC ..... B23Q 11/0092; B24B 27/08; B24B 47/12; H02P 3/02; H02P 3/04; H02P 3/06; H02P 3/14; H02P 3/12; H02P 3/22; H02P 3/16; B60L 7/10; B60L 7/22; H02K 7/102–7/106; H02K 17/10; H02K 17/165; H02K 21/46
USPC ............ 451/344–359; 310/77; 318/515–516, 318/362–376
See application file for complete search history.

(56) References Cited

U.S. PATENT DOCUMENTS

| 5,107,730 A * | 4/1992 | Muraki ..................... B23Q 5/20 82/1.11 |
| 5,552,686 A * | 9/1996 | Schmid .................. H02K 7/106 318/251 |
| 5,828,195 A * | 10/1998 | Zalesski ................. H02K 29/06 318/366 |
| 6,780,094 B2 * | 8/2004 | Walker .................... B24B 23/04 451/356 |
| 7,654,886 B2 * | 2/2010 | Chang .................. B24B 23/043 451/359 |

(Continued)

*Primary Examiner* — George B Nguyen
(74) *Attorney, Agent, or Firm* — Greenberg Traurig, LLP

(57) ABSTRACT

An angle grinder includes a motor including a rotor and windings, a power supply for supplying power to the motor, a main switch for turning on/off an electrical connection between the windings of the motor and the power supply, an output shaft driven by the rotor to rotate, a rotor brake circuit for slowing down the rotor of the motor when the windings are short circuited or reverse connected, an output shaft brake circuit for producing a magnetic field to slow down the output shaft and a controller for detecting whether the rotor brake circuit short circuits or reverse connects with the windings. When the windings are short circuited or reverse connected for a time which reaches a preset value, the output shaft brake circuit produces the magnetic field to slow down the output shaft.

10 Claims, 9 Drawing Sheets

(56) References Cited

U.S. PATENT DOCUMENTS

| | | | | |
|---|---|---|---|---|
| 8,596,427 B2* | 12/2013 | Numata | ................ | B24B 23/028 |
| | | | | 171/141 |
| 2006/0087267 A1* | 4/2006 | Kawamura | ............... | H02P 3/12 |
| | | | | 318/364 |
| 2007/0063595 A1* | 3/2007 | Habibi | ................. | H02K 1/2786 |
| | | | | 310/67 A |
| 2010/0194315 A1* | 8/2010 | Kusakawa | ............. | B25B 21/00 |
| | | | | 318/379 |
| 2012/0019177 A1* | 1/2012 | Kaufmann | ............. | B25F 5/001 |
| | | | | 318/379 |
| 2013/0307446 A1* | 11/2013 | Ichikawa | ................. | H02P 3/22 |
| | | | | 318/362 |
| 2015/0091480 A1* | 4/2015 | Kischka | .................... | H02P 3/18 |
| | | | | 318/374 |
| 2015/0137717 A1* | 5/2015 | Ishikawa | ................. | B25F 5/00 |
| | | | | 318/379 |
| 2015/0256111 A1* | 9/2015 | Forster | ..................... | H02P 6/14 |
| | | | | 318/400.22 |
| 2016/0380559 A1* | 12/2016 | Horng | ....................... | H02P 3/22 |
| | | | | 318/379 |
| 2018/0337575 A1* | 11/2018 | Sengiku | ............. | H01R 13/5025 |
| 2019/0120347 A1* | 4/2019 | Bek | .......................... | B25F 3/00 |

* cited by examiner

ANGLE GRINDER, POWER TOOL AND BRAKING METHOD THEREOF

RELATED APPLICATION INFORMATION

This application claims the benefit under 35 U.S.C. § 119(a) of Chinese Patent Application No. CN 201611061012.0, filed on Nov. 25, 2016, the disclosure of which is incorporated herein by reference in its entirety.

FIELD OF THE DISCLOSURE

The present disclosure relates generally to power tools and, more particularly, to a power tool being able to brake a motor.

BACKGROUND OF THE DISCLOSURE

Power tools include a motor for driving a working attachment to perform the function of a tool.

Angle grinders are a kind of hand-held power tools. A grinding disc is acted as the working attachment of the angle grinder, which is used to cut or grind a workpiece. When a user turns off or releases a switch, the grinding disc is expected to stop rapidly to prevent contact between the moving grinding disc and an object.

The statements in this section merely provide background information related to the present disclosure and may not constitute prior art.

SUMMARY

In one aspect of the disclosure, an angle grinder is provided. The angle grinder includes a motor including a rotor and windings, a power supply for supplying power to the motor, a main switch for turning on/off an electrical connection between the windings of the motor and the power supply, an output shaft driven by the rotor to rotate, a rotor brake circuit for slowing down the rotor of the motor when the windings are short circuited or reverse connected, an output shaft brake circuit for producing a magnetic field to slow down the output shaft and a controller for detecting whether the rotor brake circuit short circuits or reverse connects the windings. When the windings are short circuited or reverse connected for a time which reaches a preset value, the output shaft brake circuit produces the magnetic field to slow down the output shaft.

In another aspect of the disclosure, a power tool is provided. The power tool includes a motor including a rotor and windings, an output shaft driven by the rotor to rotate, a rotor brake circuit for short circuiting or reverse connecting the winds so as to slow down the rotor, an output shaft brake circuit for producing a magnetic field to slow down the output shaft and a controller for detecting whether the rotor brake circuit short circuits or reverse connects with the windings. When the windings are in a short circuit state or a reverse connection state for a time which reaches a preset value, the output shaft brake circuit produces the magnetic field to slow down the output shaft.

In another aspect of the disclosure, a method for braking a motor of a power tool is provided. The motor includes a rotor and windings. The power tool includes a rotor brake circuit and an output shaft brake circuit. The method includes detecting whether the rotor brake circuit short circuits or reverse connects with the windings and, when the windings are in a short circuit state or a reverse connection state for a time which reaches a preset value, the output shaft brake circuit produces a magnetic field to slow down an output shaft Further areas of applicability will become apparent from the description provided herein. It should be understood that the description and specific examples are intended for purposes of illustration only and are not intended to limit the scope of the present disclosure.

Figure 1:
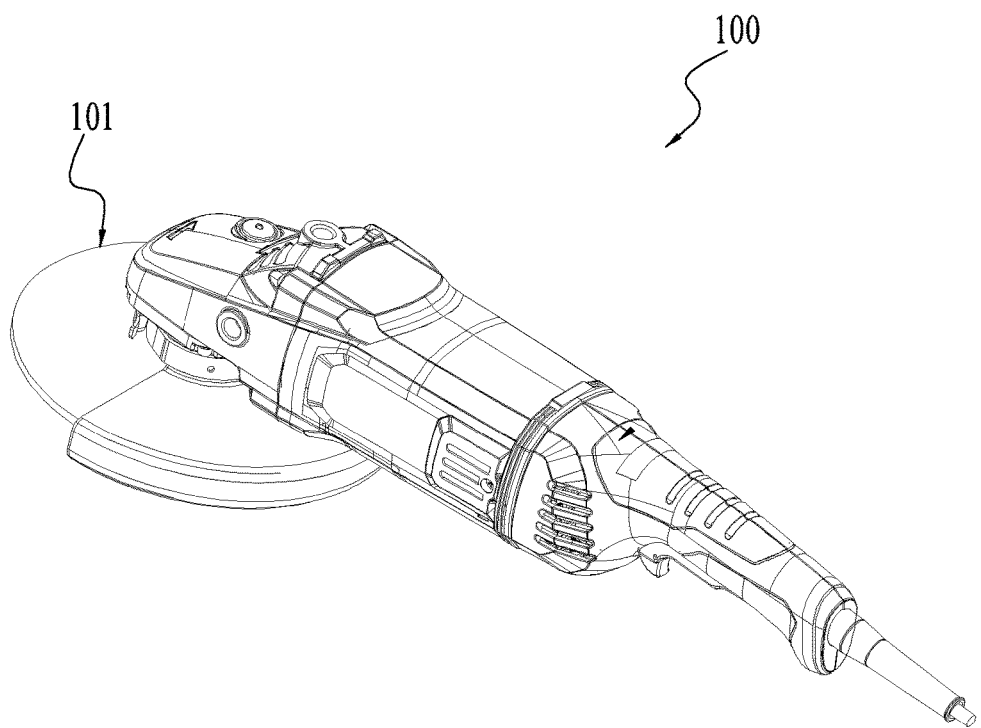
FIG. 1 is a schematic view of an exemplary power tool.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the scope of the invention claimed, its application, or uses.

Figure 2:
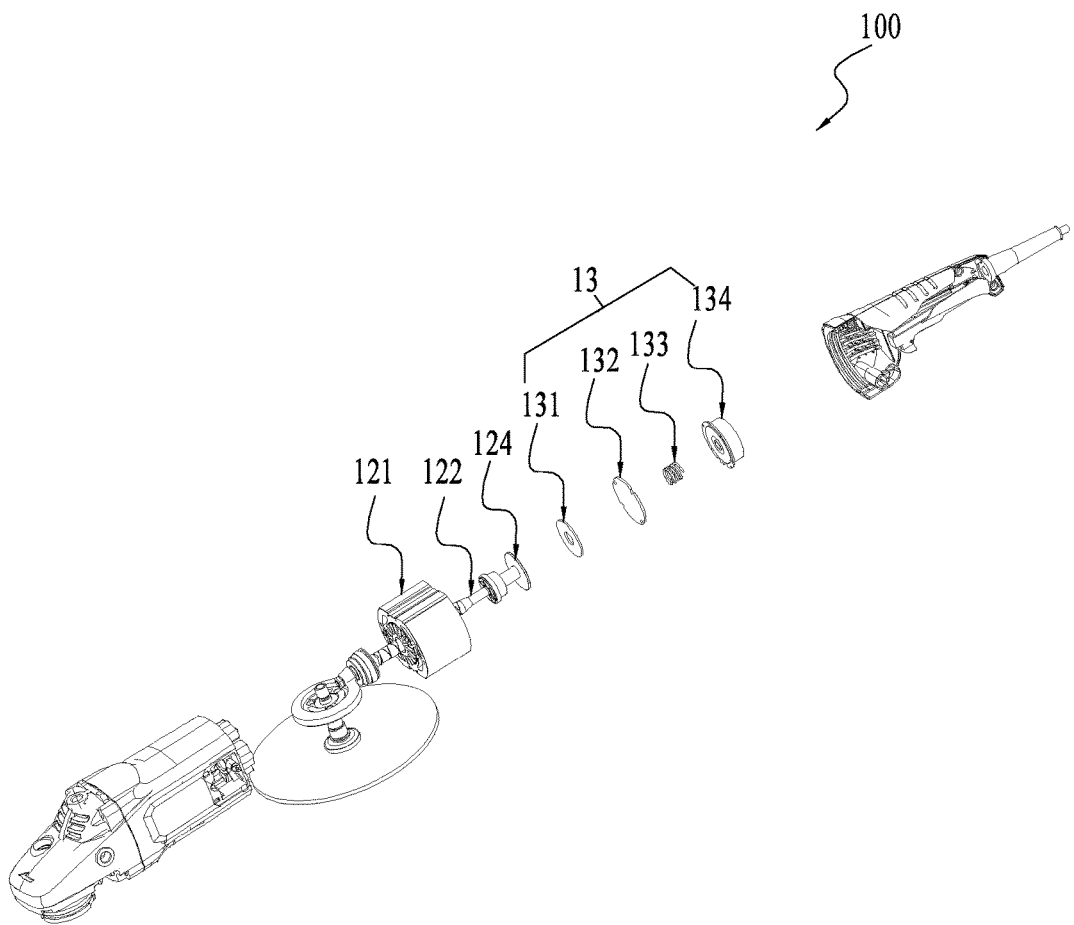
FIG. 2 an exploded view of the power tool in FIG. 1.
Figure 3:
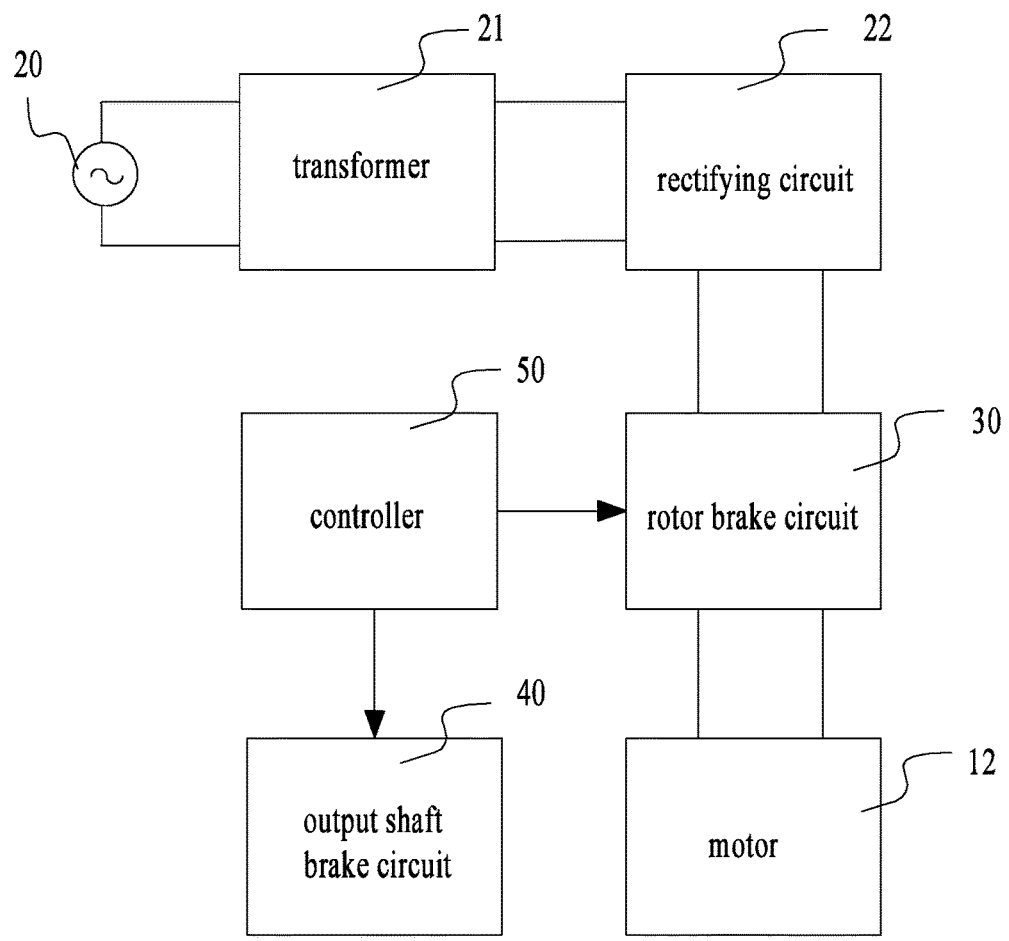
FIG. 3 is a circuit block diagram of the power tool in FIG. 1.

Referring to FIGS. 1-3, a power tool 100 includes a grinding disc 110, a motor 12, an output shaft, a mechanical braking device 13, a power supply 20, a rotor brake circuit 30 and an output shaft brake circuit 40. Specifically, the power tool 100 is an angle grinder.

The grinding disc 110 is used to realize the function of grinding or cutting.

The power supply 20 is used to supply electric energy to the motor 12, which can be DC power or AC power. Specifically, the AC power is AC commercial power, and the DC power is supplied by a battery pack. When it is needed to convert the AC power to the DC power, a transformer 21 and a rectifying circuit 22 (as shown in FIG. 3) are disposed between the power supply 20 and the motor 12. The AC power is reduced through the transformer 21 which then outputs DC power through the rectifying circuit 22 to the motor 12.

The motor 12 mainly includes a rotor 121 and windings 123. The power supply 20 supplies power to the motor 12. The windings 123 includes coils 123*a*, 123*b*. When the coils 123*a*, 123*b* are powered on, they are able to generate a magnetic field to drive the rotor 121 to rotate. Specifically, the motor 12 can be an AC motor or a DC motor, and a single-phase motor or a three-phrase motor.

The output shaft can be driven to rotate by the rotor 121. An end of the output shaft is used to mount or fix the grinding disc 110. The rotor 121 rotates to drive the output shaft to rotate, and the output shaft drives the grinding disc 110 to rotate to grind or cut. It is noted that, a device which can be driven to rotate by the rotor 121 can be considered as the output shaft of the present invention. As shown in FIG. 2, a flange 124 is fastened on an end of a motor shaft 122 which is far from the grinding disc 110. The rotor 121 is able to drive the flange 124 to rotate. Both the motor shaft 122 and the flange 124 are the output shaft mentioned herein. However, in some power tools, the output shaft only includes the motor shaft 122 or includes the motor shaft 122 and other transmission device connected with the motor shaft 122.

A main switch 31 is used to turn on/off the electrical connection of the motor 12 and the power supply 20. Specifically, the main switch 31 is used to turn on/off the electrical connection of the windings 122 of the motor 12 and the power supply 20. In an exemplary tool, the main switch 31 is disposed at a position on the angle grinder which is easy for a user to operate. When the user activates the main switch 31, the electrical connection of the motor 12 and the power supply 20 is turned on, and the motor 12 drives the grinding disc to grind or cut a workpiece. When the user releases the main switch 31, the electrical connection of the motor 12 and the power supply 20 is turned off. Specifically, the main switch 31 is a single-pole double-throw switch or two linked single-pole double-throw switches.

When the user releases the main switch 31, the grinding disc 101 is preferably braked rapidly to prevent the moving grinding disc 101 from accidentally contacting an object.

The rotor brake circuit 30 is used to short-circuit or reverse connect the windings 123 so as to slow down the rotor 121 of the motor 12. Specifically, the rotor brake circuit 30 is connected between the power supply 20 and the motor 12. When the user releases the main switch 31, the rotor brake circuit 30 starts working. The rotor brake circuit 30 short-circuits or reverse connects the windings 123 so as to slow down the rotor 121 of the motor 12, so that the grinding disc 101 fastened on the output shaft is slowed down.

The output shaft brake circuit 40 is used to produce a magnetic field for slowing down the output shaft. The mechanical braking device 13 responds to the magnetic field produced by the output shaft brake circuit 40 and acts on the output shaft in a mechanical method so as to slow down the output shaft. So, the grinding disc 101 is braked.

As shown in FIG. 2, alternatively, the mechanical braking device 13 includes a friction element 131, a supporting element 132, an elastic element 133 and a magnetic element 134.

The friction element 131 rubs with the flange 124 to brake the motor shaft 122. The flange 124 is formed with a braking surface for matching with the friction element 131. The braking surface is substantially perpendicular to a rotation axis of the motor shaft 122.

The supporting element 132 is used to fix the friction element 131. The friction element 131 is made of wear-resistant material. The supporting element 132 is made of metal material which can be attracted by the magnetic element 134 so as to separate the friction element 131 and the flange 124.

The elastic element 133 can apply a force on the supporting element 132 and the friction element 131 to make them separate. Specifically, the elastic element 133 is a spring.

The magnetic element 134 responds the magnetic field produced by the output shaft brake circuit 40 and applies force on the friction element 131 to make the friction element 131 and the flange 124 separate when the connection of the motor 12 and the power supply 20 is turned on. When the connection of the motor 12 and the power supply 20 is turned off, the magnetic element 134 applies a force on the friction element 131 to make the friction element 131 and the flange 124 contact. So, the output shaft is stopped rapidly.

A device which is able to respond the magnetic field produced by the output shaft brake circuit 40 and brake the output shaft can be used as the mechanical braking device 13 herein.

A controller 50 is connected electrically with the rotor brake circuit 30 and the output shaft brake circuit 40. The controller 50 can detect whether the rotor brake circuit 30 short circuits or reverse connects the windings 123. When the windings 123 are short circuited or reverse connected for a time which reaches a preset value, the controller 50 outputs a control signal to the output shaft brake circuit 40 so as to make the output shaft brake circuit 40 produce the magnetic field for slowing down the output shaft. Specifically, the preset value is less than or equal to 3 s. More specifically, the preset value is less than or equal to 2 s.

Referring to FIGS. 4-7, a braking process of the power tool 100 is illustrated. The main switch 312 is used to switch a driving state and a braking state of the motor 12. When the user activates the main switch 312, the motor 12 works normally. When the user releases the main switch 312, the rotor brake circuit 30 starts working. The controller 50 controls the output shaft brake circuit 40 to work until the motor 12 stops rotating when the driving time of the rotor brake circuit 30 reaches a preset value.

Figure 4:
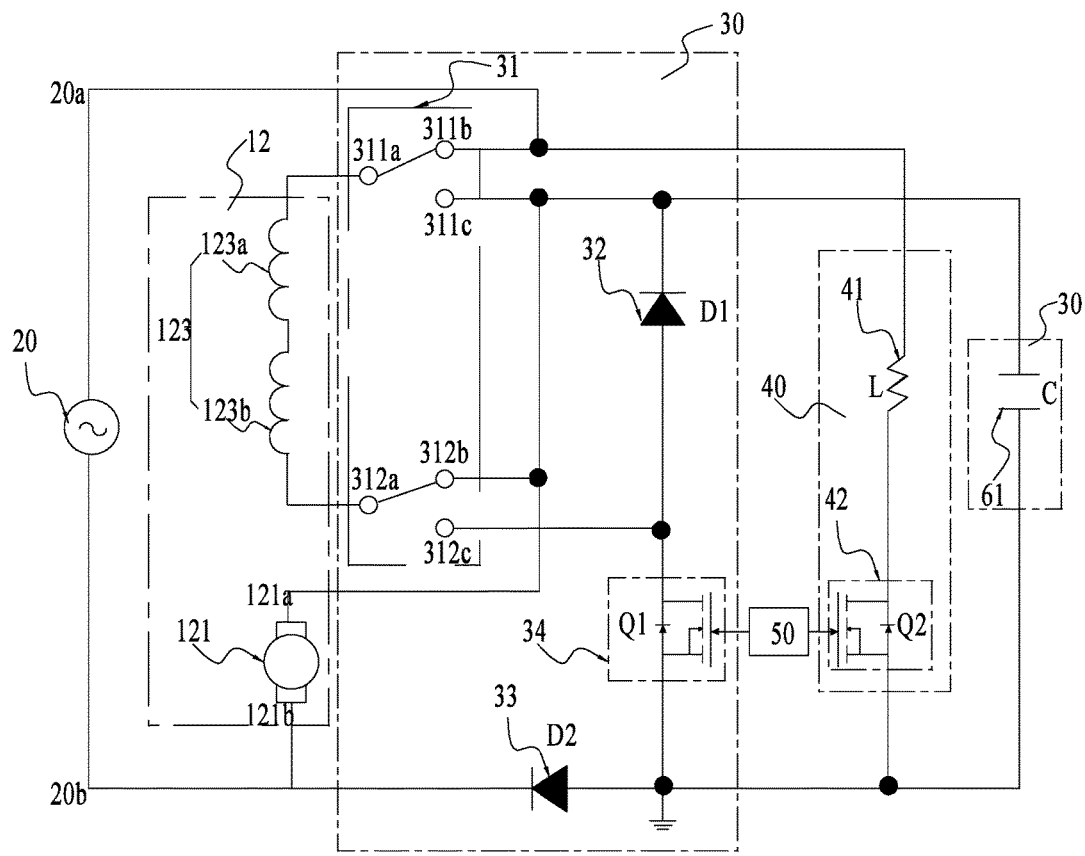
FIG. 4 is a circuit diagram of the power tool in FIG. 1, wherein the motor is in a driving state.

As shown in FIG. 4, a circuit diagram of the power tool 100 is shown in which the motor 12 is in the driving state, and the rotor brake circuit 30 and the output brake circuit 40 are not activated.

The main switch 31 includes a first switch and a second switch. The first switch includes a first terminal 311a, a second terminal 311b, and a third terminal 311c. The first switch has a first state wherein the first terminal 311a and the second terminal 311b are connected and a second state wherein the first terminal 311a and the third terminal 311c are connected. The second switch includes a forth terminal 312a, a fifth terminal 312b and a sixth terminal 312c. The second switch has two states. In one of the two states, the forth terminal 312a and the fifth terminal 312b are connected, and in the other state, the forth terminal 312a and the sixth terminal 312c are connected. The third terminal 311c is connected with the fifth terminal 312b. The first terminal 311a is connected with the coil 123a. The second terminal 311b is connected with a connecting end 20a of the power supply 20. The connecting end 20a is used to connect with one side of the power supply 20. The other connecting end 20b of the power supply 20 is connected with a connecting terminal 121b of the rotor 121. The first switch and the second switch are linked. That is, when the first switch is switched from the first state to the second state, the second switch switches from the state wherein the forth terminal 312a and the fifth terminal 312b are connected to the other state wherein the forth terminal 312a and the sixth terminal 312c are connected. When the first terminal 311a is connected with the third terminal 311c and the forth terminal 312a is connected with the sixth terminal 312c, the rotor brake circuit 30 is in the braking state and the rotor 121 is short circuited or reverse connected, so that the rotor 121 slows down.

When the user activates the main switch 31, the first terminal 311a is connected with the second terminal 311b and the forth terminal 312a is connected with the fifth terminal 312b. The power supply 20, the coils 123a, 123b and the rotor 121 are connected in turn to constitute a closed circuit. The motor 12 is in the driving state.

The circuit of the power tool 100 further includes a tank circuit 60 connected with the power supply 20. When the main switch 31 is turned on, the electric energy is stored in the tank circuit 60. When the rotor brake circuit 30 works, the electric energy is released from the tank circuit 60. That is, when the motor 12 is in the driving sate, the electric energy is stored, and when the motor 12 is in the braking state, the electric energy is released. Specifically, the tank circuit 60 includes a storage element 61. An end of the tank circuit 60 is connected with the third terminal 311c, and the other end is connected with a second semiconductor element 33. The current flowing through the tank circuit 60 only can flow from the third terminal 311c to the connecting end 20b of the power supply. Alternatively, the storage element 61 is a capacitor C.

When the user releases the main switch 31, the first terminal 311a is connected with the third terminal 311c, and the forth terminal 312a is connected with the sixth terminal 312c. The rotor brake circuit 30 starts working.

Figure 5:
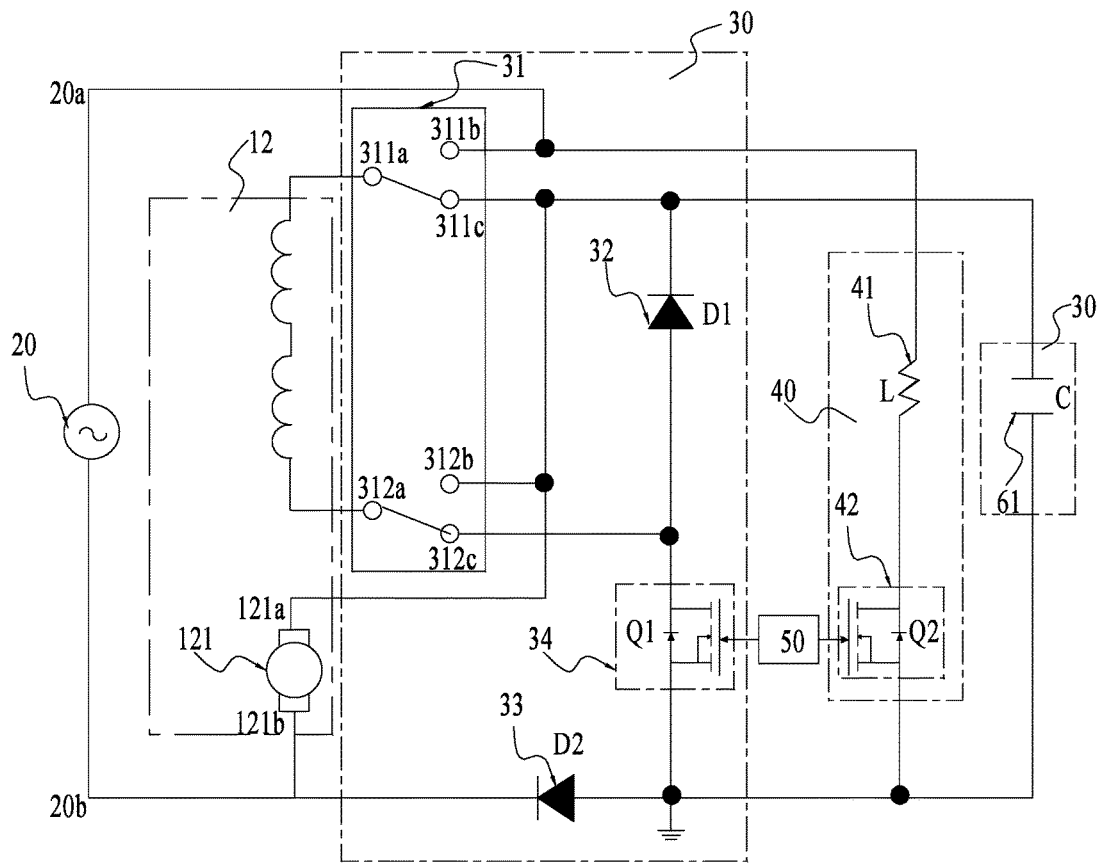
FIG. 5 is a circuit diagram of the power tool in FIG. 1, wherein the motor is in a braking state.

Shown in FIG. 5 is an example of the motor 12 in the braking state. The rotor brake circuit 30 includes the main switch 31, the connecting ends 20a, 20b of the power supply 20, a first semiconductor element 32, the second semiconductor element 33 and a semiconductor switch 34. The semiconductor switch 34 is connected electrically with the controller 50 to turn on/off the rotor brake circuit 30. The first semiconductor element 32 makes the current only flow from the sixth terminal 312c to the third terminal 311c unidirectionally. The second semiconductor element 33 makes the current only flow from the sixth terminal 312c to the connecting terminal 121b of the rotor 121 unidirectionally.

Specifically, the first semiconductor element 32 is a free-wheeling diode D1. The anode of the diode D1 is connected with the sixth terminal 312c and the cathode of the diode D1 is connected with the third terminal 311c. The second semiconductor element 33 is a diode D2. The semiconductor switch 34 is a field-effect transistor Q1. The drain electrode of the field-effect transistor Q1 is connected with the third terminal 311c, the source electrode of the field-effect transistor Q1 is connected with the anode of the diode D1, and the grid electrode of the field-effect transistor Q1 is connected with the controller 50.

The output shaft brake circuit 40 includes a coil 41 and a brake switch 42. The brake switch 42 is connected electrically with the controller 50 for turning on the electrical connection of the output shaft brake circuit 40 and the power supply 20. When the coil 41 is powered on, it can produce a magnetic field for slowing down the output shaft.

Specifically, the brake switch 42 is a field-effect transistor Q2. The high voltage terminal of the coil 41 is connected with the positive electrode of the power supply 20, and the low voltage terminal of the coil 41 is connected with the drain electrode of the field-effect transistor Q2. The source electrode of the field-effect transistor Q2 is connected with the anode of the diode D2. The grid electrode of the field-effect transistor Q2 is connected with the controller 50.

Figure 6:
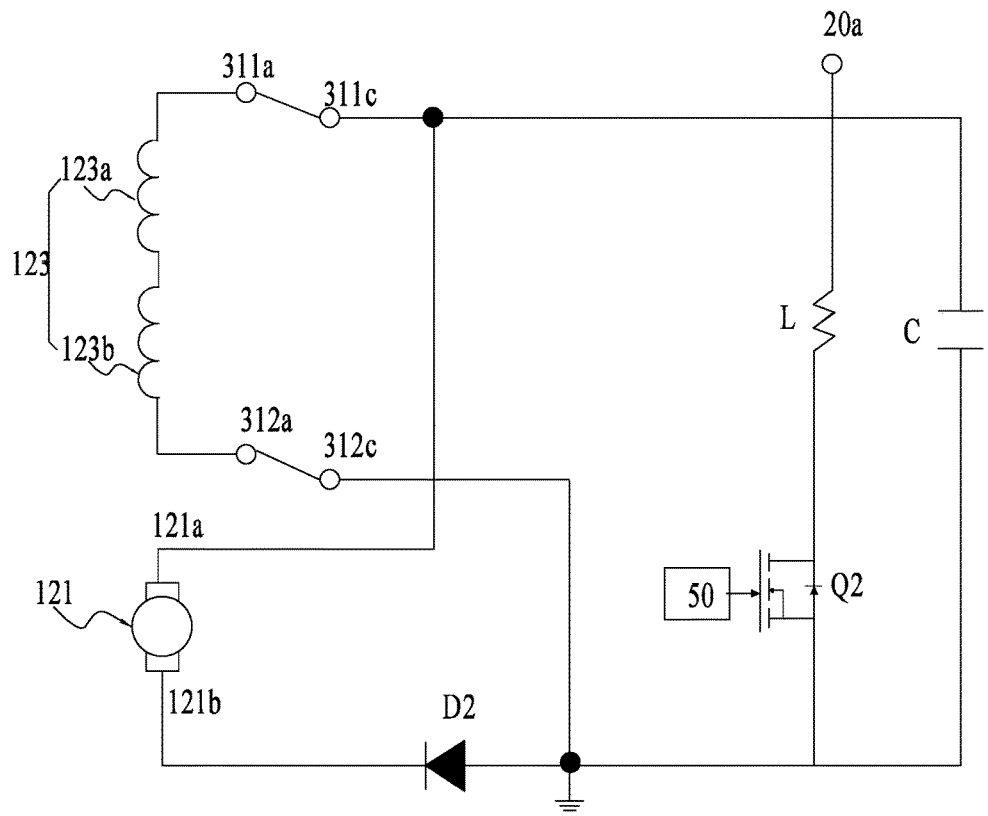
FIG. 6 is an equivalent circuit block diagram of a first loop circuit formed by the circuit diagram in FIG. 5.
Figure 7:
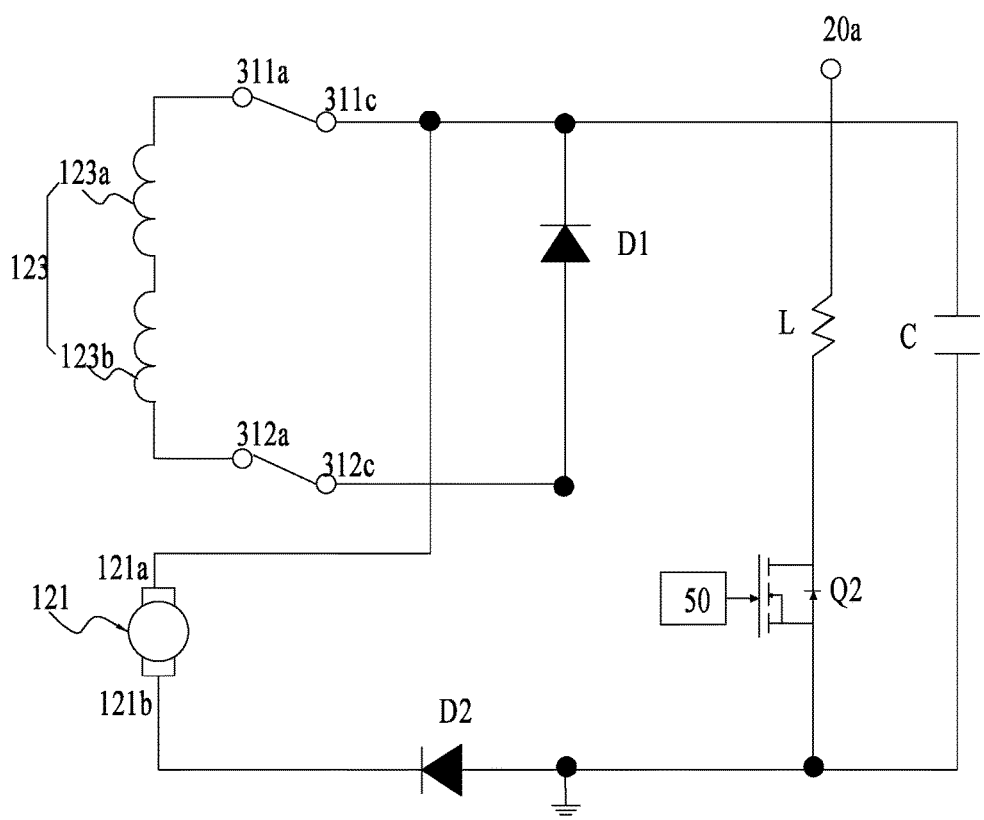
FIG. 7 is an equivalent circuit block diagram of a second loop circuit formed by the circuit diagram in FIG. 5.

Referring to FIGS. 6-7, an operating principle of the rotor brake circuit 30 and the output shaft brake circuit 40 is illustrated as follow.

As shown in FIG. 6, the first terminal 311a is connected with the third terminal 311c, and the forth terminal 312a is connected with the sixth terminal 312c. The tank circuit 60 releases the electric energy. The field-effect transistor Q1 acting as the semiconductor switch 34 is disconnected, and the diode D1 is turned on. The diode D1 and the windings 123 constitute a first loop circuit. The windings 123 are short circuited to produce the magnetic field for stopping the rotor 121 from rotating. So, the rotor 121 is slowed down. The controller 50 detects the short circuit of the windings 123 and outputs a control signal to turn on the field-effect transistor Q2 acting as the output shaft brake switch 42. As shown in FIG. 7, the field-effect transistor Q1 acting as the semiconductor switch 34 is turned on. The current flows through the field-effect transistor Q1, the rotor 121 and the windings 123 so as to constitute a second loop circuit. The windings 123 are reverse connected to produce the magnetic field for stopping the rotor from rotating. So, the rotor 121 is slowed down.

The controller 50 is connected electrically with the rotor brake circuit 30 and the output shaft brake circuit 40. When the rotor brake circuit 30 works, the controller 50 determines whether the windings 123 are short circuited or reverse connected. Specifically, the controller 50 collects the voltage of the third terminal 311c (the anode voltage of the capacitor C) and the voltage of the sixth terminal 312c. The controller 50 determines whether the windings 123 are short circuited or reverse connected according to the voltage detected. When the voltage of the third terminal 311c (the anode voltage of the capacitor C) and the voltage of the sixth terminal 312c are approximately equal, the windings 123 are determined to be in the short circuit state. When the voltage of the third terminal 311c is less than the voltage of the sixth terminal 312c, the windings 123 are determined to be in the reverse connection state. However, the controller 50 also can collect the current flowing through the windings 123 to determine whether the windings 123 are short circuited or reverse connected.

The controller 50 detects whether the windings 123 are short circuited or reverse connected and maintains the windings 123 in the short circuit state or in the reverse connection state for the preset time value. The controller 50 outputs the control signal to turn on the second semiconductor switch Q2. The output shaft brake circuit 40 works. The power supply 20 supplies power to the coil 41, and the coil 41 produces the changing magnetic field to release the magnetic element 134. The magnetic element 134 applies force on the friction element 131 to make the friction element 131 and the flange 124 contact. So, the output shaft is stopped rapidly.

Figure 8:
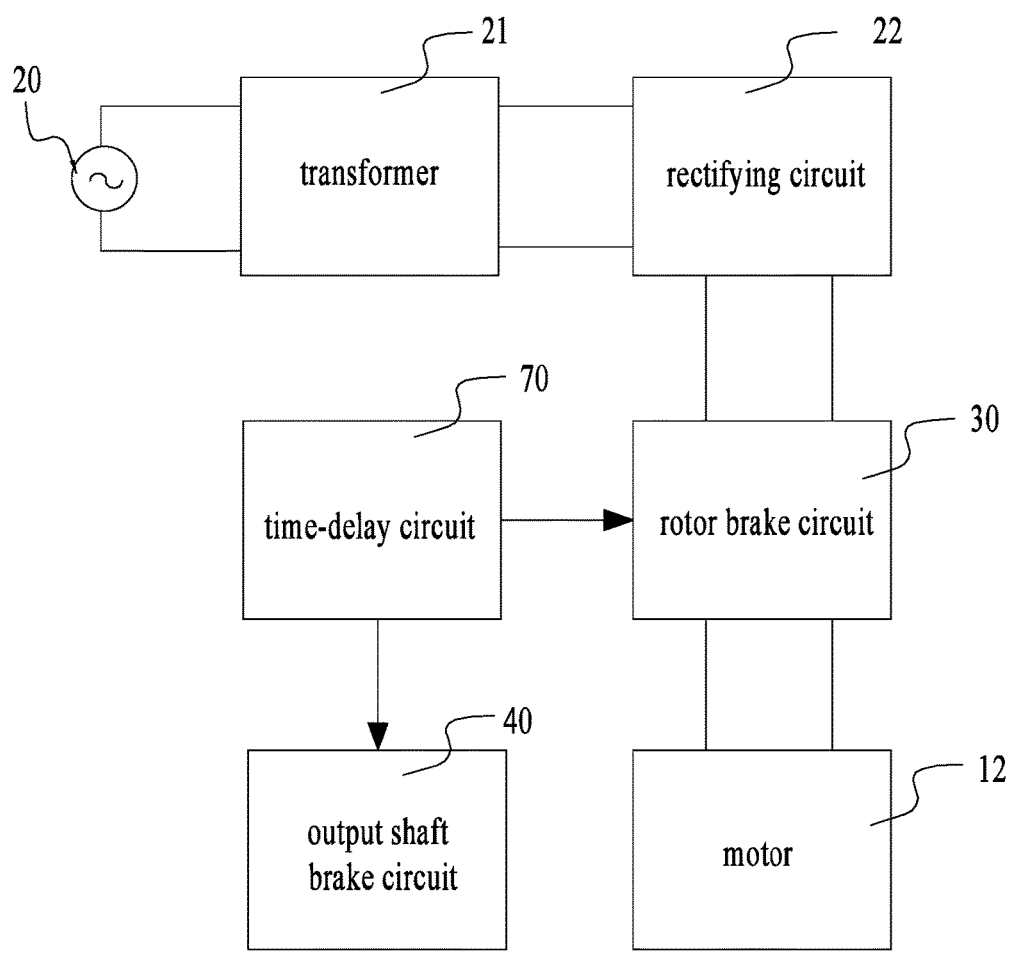
FIG. 8 is another circuit block diagram of the power tool in FIG. 1.

As shown in FIG. 8, in another example the controller 50 can be replaced by a time-delay circuit 60. The time-delay circuit 60 at least includes a time-delay element which is able to maintain the windings in the short circuit state or in the reverse connection state for a preset time while detecting whether the windings are short circuited or reverse connected. And then the time-delay element turns on the rotor brake circuit to make the rotor brake circuit work. Specifically, the time-delay element is a capacitor. However, a combination of the time-delay circuit 60 and the controller 50 can be used.

The motor of the power tool 100 is braked in a preset time through the rotor brake circuit. So, the speed of the motor is decreased rapidly. The output shaft is braked through the mechanical braking device activated by the output shaft brake circuit. Thus, the wear of the mechanical braking device is reduced while the braking efficiency of the motor is improved, and the service life is extended.

Figure 9:
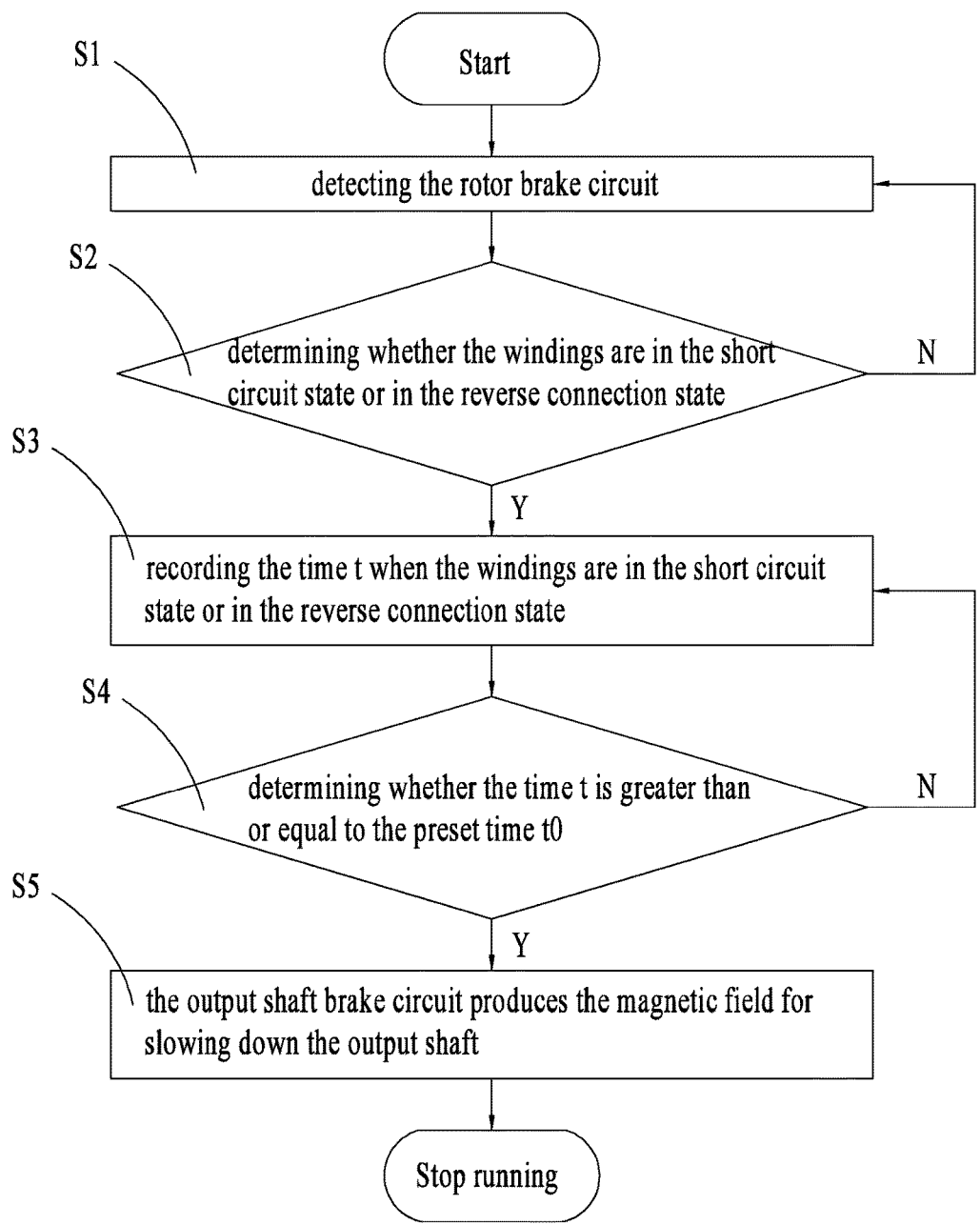
FIG. 9 is a flow diagram of a method for braking a motor of the power tool.

As shown in FIG. 9, a method for braking the motor of the power tool is shown, the motor includes the rotor and the windings. The power tool includes the rotor brake circuit and the output shaft brake circuit. The method includes detecting whether the windings are short circuited or reverse connected and, when the windings are in the short circuit state or in the reverse connection state for a time which reaches the preset value, the output shaft brake circuit produces the magnetic field for slowing down the output shaft.

As shown in FIG. 9, a method for braking the motor of the power tool is shown, the motor includes the rotor and the windings. The power tool includes the rotor brake circuit and the output shaft brake circuit. The method includes:

S1 detecting the rotor brake circuit (specifically, detecting the voltage of the third terminal 311c of the rotor brake circuit (the anode voltage of the capacitor C) and the voltage of the sixth terminal 312c);

S2 determining whether the windings are in the short circuit state or in the reverse connection state (When the voltage of the third terminal 311c (the anode voltage of the capacitor C) and the voltage of the sixth terminal 312c are approximately equal, the windings 123 are determined to be in the short circuit state. When the voltage of the third terminal 311c is less than the voltage of the sixth terminal 312c, the windings 123 are determined to be in the reverse connection state);

S3 if the windings are in the short circuit state or in the reverse connection state, the time t when the windings are in the short circuit state or in the reverse connection state is recorded, if not, going back to S1;

S4 determining whether the time t is greater than or equal to the preset time $t_0$; and S5 if t≥$t_0$, the output shaft brake circuit produces the magnetic field for slowing down the output shaft, if not, going back to S4.

The above illustrates and describes basic principles, main features and advantages of the invention hereinafter claimed. Those skilled in the art should appreciate that the above examples do not limit the claimed invention in any form. Technical solutions obtained by equivalent substitution or equivalent variations all fall within the scope of the claimed invention.

What is claimed is:

1. An angle grinder, comprising:
    a motor comprising a rotor and windings;
    a power supply for supplying power to the motor;
    a main switch for turning on/off an electrical connection between the windings of the motor and the power supply;
    an output shaft driven by the rotor to rotate;
    a rotor brake circuit for slowing down the rotor of the motor when the windings are short circuited or reverse connected;
    an output shaft brake circuit for producing a magnetic field to slow down the output shaft; and
    a controller for detecting whether the rotor brake circuit short circuits or reverse connects the windings;
    wherein when the windings are short circuited or reverse connected for a time which reaches a preset value, the output shaft brake circuit produces the magnetic field to slow down the output shaft.

2. The angle grinder of claim 1, wherein the preset value is less than or equal to 3 s.

3. The angle grinder of claim 1, further comprising an output shaft brake switch for turning on an electrical connection between the output shaft brake circuit and the power supply wherein the output shaft brake switch is connected electrically with the controller.

4. The angle grinder of claim 3, wherein the output shaft brake switch is a field effect transistor.

5. The angle grinder of claim 1, further comprises a mechanical braking device, the mechanical braking device comprising a magnetic element for responding to the output shaft brake circuit and producing a magnetic field to slow down the output shaft.

6. The angle grinder of claim 1, wherein the rotor brake circuit comprises a semiconductor switch and the semiconductor switch is connected electrically with the controller for turning on/off the rotor brake circuit.

7. The angle grinder of claim 1, further comprising a tank circuit wherein, when the main switch is powered on, electric energy is stored in the tank circuit and, when the rotor braking circuit is working, the electric energy is released from the tank circuit.

8. The angle grinder of claim 1, wherein the main switch is a single-pole double-throw switch or two linked single-pole double-throw switches.

9. A power tool, comprising:
    a motor comprising a rotor and windings;
    an output shaft driven by the rotor to rotate;
    a rotor brake circuit for short circuiting or reverse connecting the winds so as to slow down the rotor;
    an output shaft brake circuit for producing a magnetic field to slow down the output shaft; and
    a controller for detecting whether the rotor brake circuit short circuits or reverse connects the windings;
    wherein, when the windings are in a short circuit state or a reverse connection state for a time which reaches a preset value, the output shaft brake circuit produces the magnetic field to slow down the output shaft.

10. A method for braking a motor of a power tool, wherein the motor comprises a rotor and windings and the power tool comprises a rotor brake circuit and an output shaft brake circuit, the method comprising:
    detecting whether the rotor brake circuit short circuits or reverse connects with the windings and;
    when the windings are in a short circuit state or a reverse connection state for a time which reaches a preset value, producing via use of the output shaft brake circuit a magnetic field to slow down an output shaft associated with the motor.

* * * * *